United States Patent [19]

Taylor

[11] Patent Number: 5,141,257
[45] Date of Patent: Aug. 25, 1992

[54] HIGH PRELOAD MECHANICAL CONNECTOR

[75] Inventor: William M. Taylor, Houston, Tex.

[73] Assignee: Cooper Industries, Inc., Houston, Tex.

[21] Appl. No.: 764,226

[22] Filed: Sep. 23, 1991

[51] Int. Cl.⁵ ............................................ F16L 35/00
[52] U.S. Cl. ................................. 285/18; 285/363; 285/920; 285/924
[58] Field of Search .............. 285/18, 363, 368, 405, 285/412, 920, 924

[56] References Cited

U.S. PATENT DOCUMENTS

| | | | |
|---|---|---|---|
| 4,012,059 | 3/1977 | Luke et al. | 285/18 |
| 4,150,477 | 4/1979 | Orr | 285/18 X |
| 4,258,792 | 3/1981 | Restarick | 285/18 |
| 4,453,566 | 6/1984 | Henderson et al. | 285/18 X |
| 4,606,557 | 8/1986 | Coffey | 285/18 |
| 4,696,494 | 9/1987 | Schmitz et al. | 285/18 |

Primary Examiner—Dave W. Arola

[57] ABSTRACT

A preloaded connection for use between subsea tubular members including a flange surrounding one end of one of the tubular members, connecting means surrounding the exterior of the other tubular member, a ring, studs extending through said flange and said ring to secure the ring to said flange, nuts on said studs to secure the flange to the ring, pressure responsive means between said ring and said flange to urge said ring away form said flange to introduce tension in said studs, means carried by said ring for engaging with the external connecting means of said other tubular member, means for moving said engaging means carried by said ring into engagement with said external connecting means, and means for venting said pressure responsive means after engagement is achieved between said engaging means and said external connecting means.

7 Claims, 1 Drawing Sheet

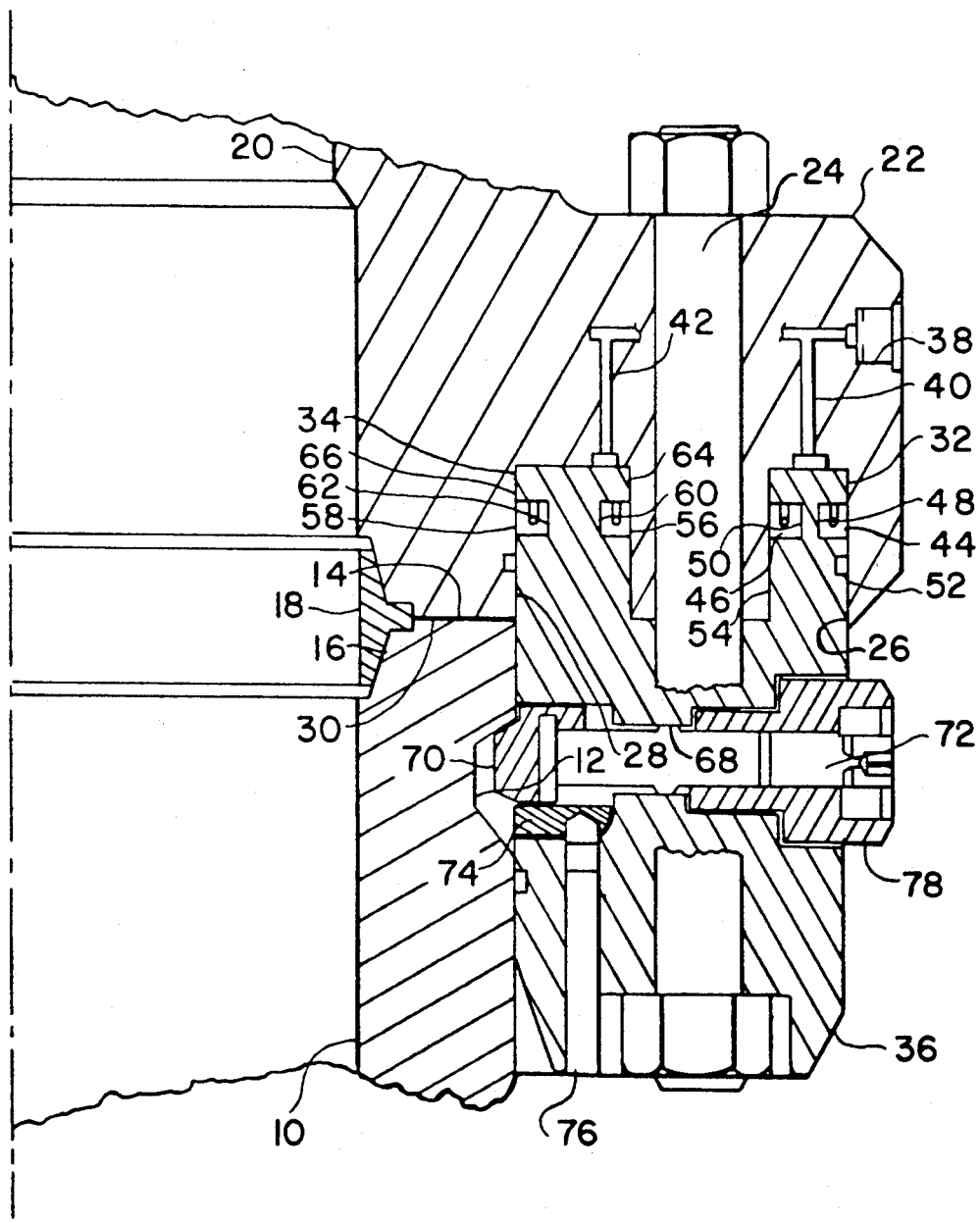

HIGH PRELOAD MECHANICAL CONNECTOR

BACKGROUND

The present invention relates to a suitable mechanical connection which can be used in a subsea or other inaccessible location with a minimum manipulation of an remote operated vehicle.

Prior to the present invention many larger subsea connections, particularly in deeper water, were made with connectors which could be lowered into position and then actuated to secure the connection by remote hydraulics. The disadvantage of such connectors is that they are often expensive but they do provide the high clamping loads which are being required in present day subsea connections with a minimum of human intervention required.

It has also been known to use studs in a connection in which a pressure responsive device was connected to the studs to place them in tension when they are in position for the connection to be completed, then tightening the nut so that the tension in the studs is secured when the pressure is released and the pressure responsive device in inactivated. Such pressure activated stud tensioners are readily available and are known.

An adjustable joint is disclosed in U.S. Pat. No. 4,696,494 wherein the joint is clamped together with studs and nuts and when it is desired to adjust the angle of one of the tubular members of the joint with respect to the other, pressure is supplied to a recess in the joint. The pressure elongates the studs to allow relative movement between the members of the joint.

SUMMARY

The present invention relates to a mechanical connection for subsea tubular members which provides a substantially high preload without the necessity of requiring the preload to be applied manually by diver or remote operated vehicle during the manual completion of the connection and includes a first subsea tubular member having an external engagement means surrounding its open end to which a second tubular member is to be connected, a flange on the connecting end of the second tubular member for mating with the open end of said first tubular member, a ring secured to said flange in position to surround the external engagement means when said second tubular member is connected to said first tubular member, a plurality of tension members connecting said ring to said flange, means for securing said tension members in position on opposite sides of said flange and said ring, pressure responsive means coacting between said flange and said ring to cause said ring to be urged away from said flange against the preload exerted by said tension members, and means carried by said ring for engaging the exterior of said first tubular member in tight gripping engagement after being urged away from said flange so that when said pressure responsive means is vented said first and said second tubular members are connected together with a preselected preload.

An object of the present invention is to provide an improved mechanical connection for underwater tubular members which can be readily connected with a minimum of manipulation.

Another object of the present invention is to provide an improved mechanical connection for underwater tubular members which can provide a substantial preloading of the connection with a minimum of manipulation.

A further object of the present invention is to provide an improved mechanical connection for underwater tubular members which can provide substantial preload with minimal manipulation at a relatively low cost.

BRIEF DESCRIPTION OF THE DRAWINGS

These and other objects and advantages of the present invention are hereinafter set forth and explained with reference to the drawings wherein:

The FIGURE is a partial sectional view of the improved connection of the present invention between two tubular members.

DESCRIPTION OF THE PREFERRED EMBODIMENTS

As shown in the FIGURE, tubular member 10, which may be any subsea member to which a connection is to be made, is provided with external groove 12 near its open end 14 and includes end preparation 16 to receive seal ring 18 as shown. Second tubular member 20 includes radially extending flange 22 through which studs 24 extend as shown and is suitably connected to a system (not shown) which is to be in communication with first tubular member 10. Outer annular recess 26 is positioned radially outward of studs 24 and inner annular recess 28 is positioned radially inward of studs 24. Recesses 26 and 28 extend upwardly from the lower surface 30 of flange 22 to receive upper rims 32 and 34, respectively, of ring 36. Port 38 in the exterior of flange 22 communicates through passages 40 and 42 to the upper ends of recesses 26 and 28. Seals 44 and 46 are positioned in grooves 48 and 50 in the exterior and interior surfaces 52 and 54 of outer rim 32. Seals 56 and 58 are positioned in grooves 60 and 62 in the exterior and interior surfaces 64 and 66 of inner rim 34.

It should be noted that the radial dimension of inner recess 28 and inner rim 34 is larger than the radial dimension of outer recess 26 and outer rim 32. This dimension is selected so that the annular effective pressure area on the end of rims 32 and 34 are substantially equal. With this relationship, the fluid pressure which is supplied from a suitable source (not shown) to port 38 and through passages 40 and 42 exerts an equal force on the upper ends of outer rim 32 and inner rim 34. In this manner the structure avoids an unbalanced force being exerted on the structure and maintains a pure tension force on the studs 24.

Radial bores 68 extends through ring 36 at positions offset angularly from studs 24 and are provided to locate segments 70 which are mounted in the interior end of bores 68 and are supported by threaded pins 72 and insert 74 positioned in the lower portion of the inner end of bores 68 by locking pins 76. Bushings 78 are threaded into the outer portion of bores 68. Pins 72 are threaded through bushings 78 and have an outer configuration which may be engaged by a suitable tool for rotary manipulation by suitable means such as an ROV or other suitable device (not shown).

From the foregoing it can be seen that when the segments 70 are retracted within the inner end of bores 68, second tubular member 20 with ring 36 secured thereto. After the assembly of second tubular member 20 and ring 36 is lowered into position with ring 36 surrounding the exterior of first tubular member 10, then suitable tension is provided to studs 24 by the application of pressure to port 38 and when this is accomplished, pins 72 are rotated so that segments 70 are moved into tight engagement within external groove 12 in the exterior of tubular member 10. When segments 70 are set, pressure supplied to port 38 is released and the stud tension which has been developed by the pressure applied to port 38 is transferred to the connection so that first tubular member 10 and second tubular member 20 are held together by this preselected load.

What I claim is:

1. A mechanical connection for subsea tubular members comprising
   a first subsea tubular member having an open end,
   a second subsea tubular member which is to be connected to the open end of said first tubular member,
   said first subsea tubular member having external connecting means surrounding its open end,
   a flange on the connecting end of the second tubular member for mating with the open end of said first tubular member,
   a ring,
   a plurality of tension members connecting said ring to said flange,
   means for tightening said tension members to exert a preload on said ring against said flange,
   pressure responsive means coacting between said flange and said ring to cause said ring to be urged away from said flange against the preload exerted by said tension members, and
   means carried by said ring for engaging said external connecting means of said first tubular member in tight gripping engagement after said ring is urged away from said flange so that when said pressure responsive means is vented said first and said second tubular members are connected together with a preselected preload.

2. A connection according to claim 1 wherein said connecting means includes
   a groove extending around the exterior of said second tubular member.

3. A connection according to claim 2 wherein said engaging means includes
   a plurality of segments carried by said ring.

4. A connection according to claim 3 including
   a pin secured to each of said segments,
   each of said pins extending through said ring and engaging the exterior of its segment,
   means coacting between said pin and said ring to allow said segments to be moved into engagement with said external groove from a position on the exterior of said ring.

5. A connection according to claim 4 wherein
   said pins extend through said ring and have their outer ends accessible from the exterior of said ring so that said pins can be moved inward to position said segments in tight engagement within said external groove in said second tubular member.

6. A connection according to claim 5 including
   threading connecting said pins and said ring to that rotation of said pins moves said segments inwardly 7. A connection according to claim 6 including
   a bushing surrounding the exterior of each of said pins and secured within said ring, each of said bushings having internal threads, each of said pins having external threads in engagement with the internal threads of its bushing.

* * * * *